US011553141B2

(12) United States Patent
Wilkinson

(10) Patent No.: US 11,553,141 B2
(45) Date of Patent: Jan. 10, 2023

(54) SYSTEM FOR CREATING A COMPOSITE IMAGE AND METHODS FOR USE THEREWITH

(71) Applicant: Passewall Research LLC, Wilmington, DE (US)

(72) Inventor: Stuart Wilkinson, Mississauga (CA)

(73) Assignee: Passewall Research LLC, Wilmington, DE (US)

(*) Notice: Subject to any disclaimer, the term of this patent is extended or adjusted under 35 U.S.C. 154(b) by 0 days.

(21) Appl. No.: 16/297,333

(22) Filed: Mar. 8, 2019

(65) Prior Publication Data
US 2019/0208140 A1  Jul. 4, 2019

Related U.S. Application Data

(63) Continuation of application No. 15/079,166, filed on Mar. 24, 2016, now Pat. No. 10,230,905, which is a
(Continued)

(51) Int. Cl.
*G06T 15/00* (2011.01)
*H04N 5/265* (2006.01)
(Continued)

(52) U.S. Cl.
CPC ............ *H04N 5/265* (2013.01); *G06T 19/006* (2013.01); *H04N 5/272* (2013.01); *H04N 5/92* (2013.01); *H04N 9/8042* (2013.01)

(58) Field of Classification Search
CPC .......... H04N 5/272; H04N 5/92; H04N 5/265; H04N 9/8042; G06T 19/006
(Continued)

(56) References Cited

U.S. PATENT DOCUMENTS 5,815,411 A * 9/1998 Ellenby ................. G01C 17/34
702/150
7,295,220 B2 * 11/2007 Zhou ..................... G06F 3/0346
345/582
(Continued)

OTHER PUBLICATIONS

Rosten E, Reitmayr G, Drummond T. Real-time video annotations for augmented reality. In International Symposium on Visual Computing Dec. 5, 2005 (pp. 294-302). Springer, Berlin, Heidelberg.*
(Continued)

*Primary Examiner* — Phu K Nguyen
(74) *Attorney, Agent, or Firm* — Robert C. Kowert; Kowert, Hood, Munyon, Rankin & Goetzel P.C.

(57) ABSTRACT

A system includes a video device for capturing, at a viewing time, a first video image corresponding to a foundation scene at a setting, the foundation scene viewed at the viewing time from a vantage position. A memory stores a library of image data including media generated at a time prior to the viewing time. A vantage position monitor tracks the vantage position and generating vantage position of a human viewer. A digital video data controller selects from the image data in the library, at the viewing time and based on the vantage position data, a plurality of second images corresponding to a modifying scene at the setting, the modifying scene further corresponding to the vantage position. A combiner combines the first video image and the plurality of second images to create a composite image for display.

20 Claims, 11 Drawing Sheets

Related U.S. Application Data continuation of application No. 14/323,179, filed on Jul. 3, 2014, now Pat. No. 9,311,753, which is a continuation of application No. 12/626,603, filed on Nov. 25, 2009, now Pat. No. 8,817,092.

(60) Provisional application No. 61/117,949, filed on Nov. 25, 2008.

(51) Int. Cl.
*H04N 5/272* (2006.01)
*H04N 5/92* (2006.01)
*H04N 9/804* (2006.01)
*G06T 19/00* (2011.01)

(58) Field of Classification Search
USPC .......................................................... 345/418
See application file for complete search history.

(56) References Cited

U.S. PATENT DOCUMENTS

| | | | |
|---|---|---|---|
| 7,693,702 | B1 | 4/2010 | Kerner et al. |
| 7,796,155 | B1* | 9/2010 | Neely, III .......... G06K 9/00771 345/418 |
| 7,995,076 | B2* | 8/2011 | Emam ................... G02B 27/017 345/629 |
| 8,810,599 | B1* | 8/2014 | Tseng .................... G05D 1/0278 345/633 |
| 9,094,615 | B2 | 7/2015 | Aman et al. |
| 9,727,996 | B2* | 8/2017 | Pandey ................... G06F 3/013 |
| 9,947,287 | B2* | 4/2018 | Lee .......................... G09G 5/02 |
| 10,553,036 | B1* | 2/2020 | Perez, III ............ G06F 3/04815 |
| 10,594,786 | B1* | 3/2020 | Perez, III ............. G02B 27/017 |
| 10,775,628 | B2* | 9/2020 | Samec ................. A61B 3/1005 |
| 2004/0008773 | A1 | 1/2004 | Itokawa |
| 2005/0053352 | A1 | 3/2005 | McKain et al. |
| 2016/0267720 | A1 | 9/2016 | Mandella et al. |
| 2019/0369716 | A1* | 12/2019 | Chen ..................... G06F 3/0482 |
| 2021/0201552 | A1* | 7/2021 | Dirksen .............. H04L 65/4053 |

OTHER PUBLICATIONS

Goldman DB, Gonterman C, Curless B, Salesin D, Seitz SM. Video object annotation, navigation, and composition. InProceedings of the 21st annual ACM symposium on User interface software and technology Oct. 19, 2008 (pp. 3-12).*

Götzelmann T, Hartmann K, Strothotte T. Annotation of Animated 3D Objects. InSimVis Mar. 8, 2007 (vol. 7, pp. 209-222).*

Azuma R, Baillot Y, Behringer R, Feiner S, Julier S, MacIntyre B. Recent advances in augmented reality. IEEE computer graphics and applications. Nov. 2001;21(6):34-47.*

Schwald, B., & De Laval, B. (2003). An augmented reality system for training and assistance to maintenance in the industrial context.*

Zauner J, Haller M, Brandl A, Hartman W. Authoring of a mixed reality assembly instructor for hierarchical structures. InThe Second IEEE and ACM International Symposium on Mixed and Augmented Reality, 2003. Proceedings. Oct. 10, 2003 (pp. 237-246). IEEE.*

Höllerer T, Feiner S, Terauchi T, Rashid G, Hallaway D. Exploring MARS: developing indoor and outdoor user interfaces to a mobile augmented reality system. Computers & Graphics. Dec. 1, 1999;23(6):779-85.*

Yovcheva Z, Buhalis D, Gatzidis C. Smartphone augmented reality applications for tourism. E-review of tourism research (ertr). 2012;10(2):63-6.*

Horry Y, Anjyo KI, Arai K. Tour into the picture: using a spidery mesh interface to make animation from a single image. InProceedings of the 24th annual conference on Computer graphics and interactive techniques Aug. 3, 1997 (pp. 225-232).*

* cited by examiner

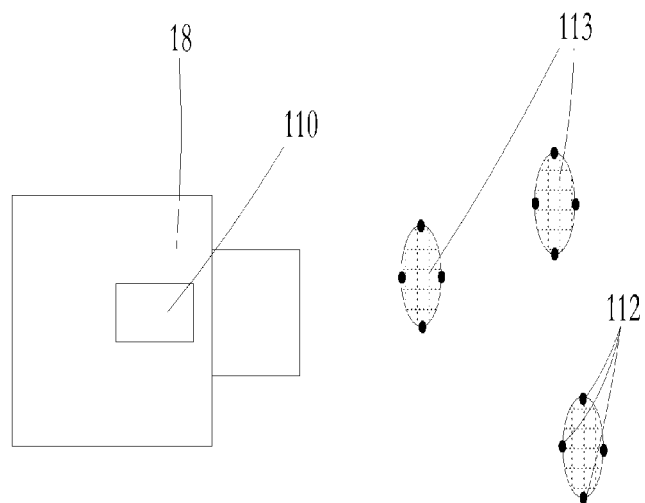
FIG. 21
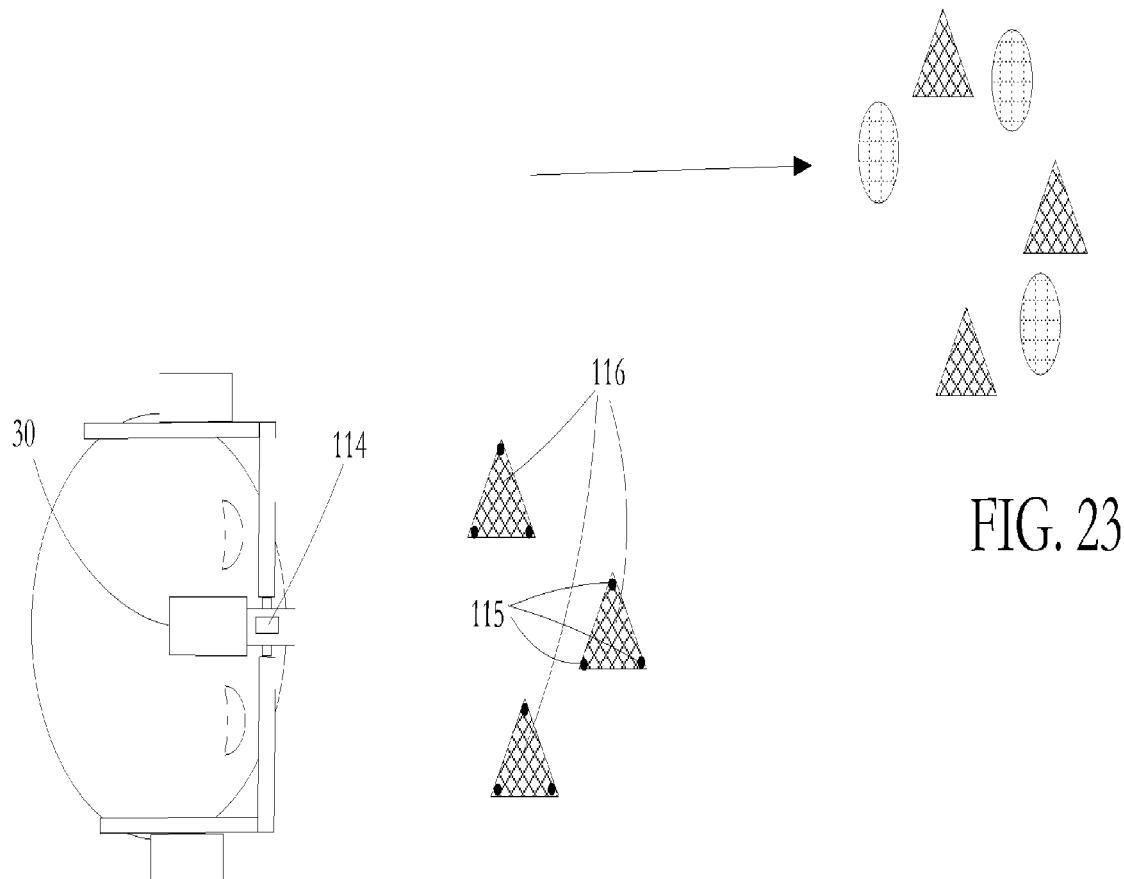
FIG. 22
FIG. 23

SYSTEM FOR CREATING A COMPOSITE IMAGE AND METHODS FOR USE THEREWITH

CROSS REFERENCE TO RELATED PATENTS

This application is a continuation of U.S. patent application Ser. No. 15/079,166, filed Mar. 24, 2016, which is a continuation of U.S. patent application Ser. No. 14/323,179, filed Jul. 3, 2014, now U.S. Pat. No. 9,311,753, which is a continuation of U.S. patent application Ser. No. 12/626,603, filed Nov. 25, 2009, now U.S. Pat. No. 8,817,092, which claims benefit of provisional U.S. Patent Application No. 61/117,949, filed on Nov. 25, 2008, which are hereby incorporated by reference herein in their entirety.

TECHNICAL FIELD OF THE INVENTION

This invention relates to a method and apparatus for generating and viewing combined images of viewed locations. The invention has particular application to enhancing the viewing experience of tourists at historically significant locations.

DESCRIPTION OF RELATED ART

At a historically significant location, it is usual to find some sort of surviving artifact—for example, a ruined temple, a harbour wall, or a castle keep—which remains to show that the location was in fact historically significant. For example, the temple was the site of worship and sacrifice, or the harbour saw the provisioning of wooden warships, or the keep was part of a castle that underwent a long siege before falling to attackers. For a tourist who will spend an hour or two at the site, some sense of the historical significance of the site can be gained by consulting a guidebook, or listening to a tour guide who is presenting either in real time or by means of an audio transcript. While a guidebook or audio aid enhances the tourist experience, improvements in the delivery of relevant information are possible.

In this respect, United States patent application 2006/0271292 describes a wearable geographical information display assembly including a heads-up display to which is mounted an attitude sensor. Both the heads-up display and the attitude sensor are coupled with a cellular phone of a type that receives geographical positioning data from orbital satellites. Positional data and data indicating line of sight from the attitude sensor are transmitted from the cell phone to a telecommunications company. The company retrieves display data corresponding to the received positional and line of sight data from a database. The display data is transmitted back to the cell phone and displayed by means of the heads-up display.

While this arrangement may be effective in presenting to the tourist a comprehensive description of what is being viewed and its significance, further improvements in the preparation and delivery of relevant information are possible which can improve a tourist's appreciation of historical sites.

BRIEF DESCRIPTION OF THE DRAWINGS

It will be appreciated that for simplicity and clarity of illustration, elements illustrated in the following FIGS. have not necessarily been drawn to scale. For example, the dimensions of some of the elements are exaggerated relative to other elements for clarity. Other advantages, features and characteristics of the present disclosure, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 21 shows a view from above of recording camera and range finder function according to an embodiment of the invention.

FIG. 22 shows a view from above of a viewer wearing a heads up viewing device according to an embodiment of the invention.

FIG. 23 is a view from above showing superinposition of objects of a modifying and a foundation image developed upon combination of the images according to one embodiment of the invention.

DETAILED DESCRIPTION OF PREFERRED EMBODIMENTS OF THE INVENTION

In this specification, "vantage position" means the combination of any one or more of a set of parameters comprising position (x,y,z), direction of viewing (i.e. the combination of azimuth and elevation), tilt (corresponding to roll in the dynamic sense), and depth of focus, that determine the position and attitude of a person or viewing device when viewing a scene. In this specification, a "foundation image" is an image of a foundation scene which is viewed at a location or setting, either directly or by means of a camera or other viewing device, at a viewing time or phase; a "modifying image" is an image of objects that do not exist at the location or setting at the viewing time, but which have existed at a prior recording time and has been previously recorded as video data and, optionally, videographics digital data in the course of a production phase.

Figure 1:
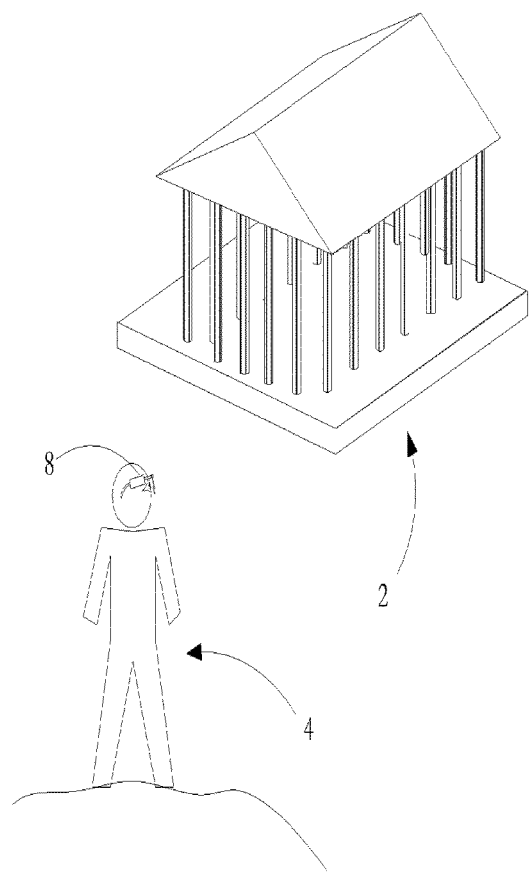
FIG. 1 shows a perspective view of a tourist location and a tourist viewing the location.
Figure 2:
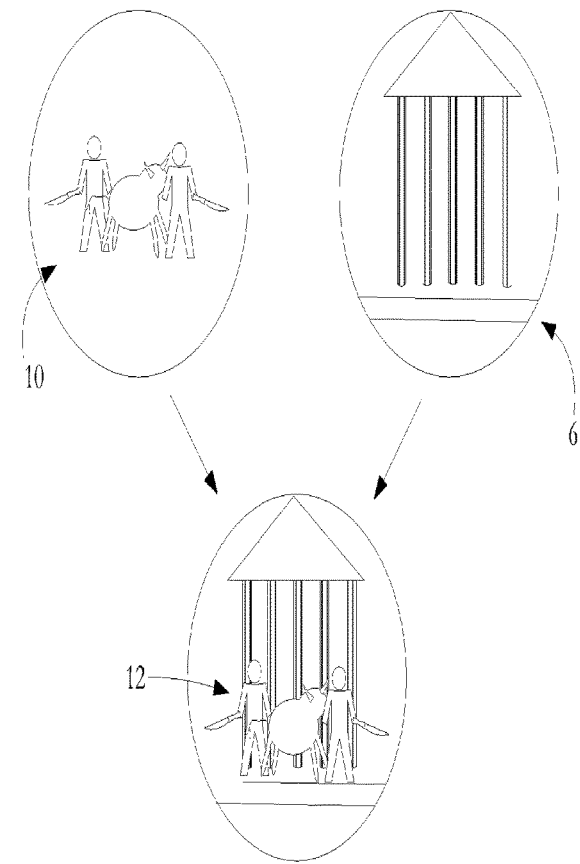
FIG. 2 shows a schematic view of a part of each of a foundation, modifying and combined image produced in the course of operating equipment according to one aspect of the invention.

Referring to FIG. 1, there is shown a historically significant location 2 which in this case is an ancient temple which is at least partially intact or restored. A tourist 4, at a different scale from the temple in this FIG., views the location from a vantage position, and from that vantage position, sees a foundation image 6 of the location, part of the foundation image being shown in the upper right circular frame in FIG. 2 and being a front view of several temple columns. The tourist wears a heads-up viewing device 8 by means of which she is viewing a combination of the foundation image 6 and a modifying image 10, part of the modifying image being shown in the upper left circular frame. Part of the combined image 12 is shown in the lower circular frame in FIG. 2. The modifying image 10 is generated as if it were being viewed from the same vantage position from which the tourist 4 views the foundation image 6. As shown in FIG. 2, elements of the modifying image 10 are combined with elements of the foundation image 6 at the heads-up viewing device 8 so that the tourist sees the elements of the modifying image located immediately in front of the temple columns.

Figure 3:
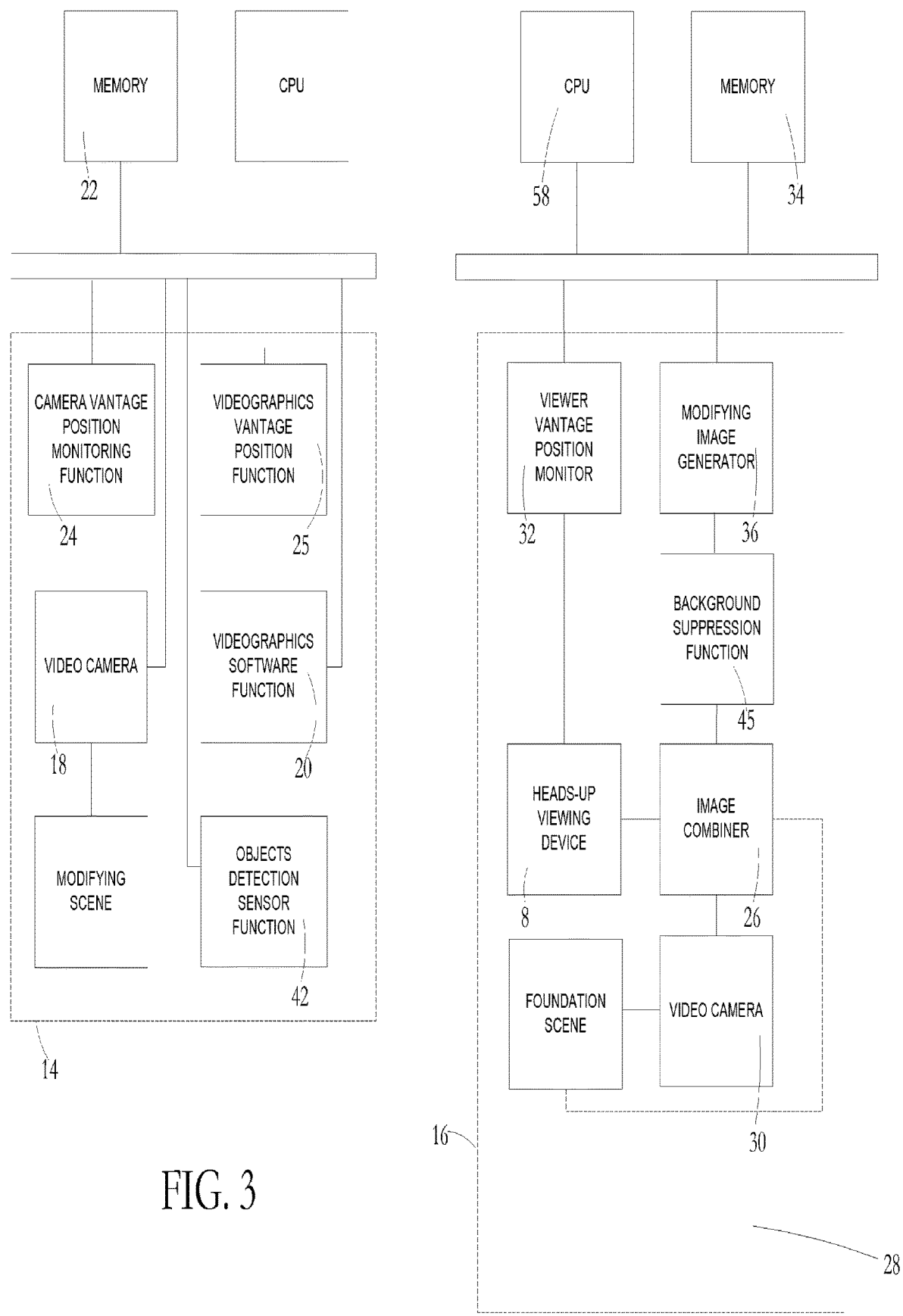
FIG. 3 shows a schematic diagram of a system according to one embodiment of the invention.

Referring to the schematic diagram of FIG. 3, a system according to one embodiment of the invention has a number of functional blocks forming part of a production phase sub-system 14 and a number of functional blocks forming part of a viewing phase sub-system 16. The production phase sub-system 14 includes either or both of a video camera 18 to record a preliminary modifying image of a modifying scene, or a videographics software development function 20 to artificially construct a modifying image 10 corresponding to a notional modifying scene. In the particular production phase sub-system 14 illustrated in FIG. 3, both a video camera 18 and videographics software development function 20 are present, the combination being operable to generate modifying images 10 which are combinations of video and videographics content. The video camera 18 or videographics development software 20 produces recorded content that is digitized and stored in memory 22 as video stream data. When using the video camera 18, a modifying image 10 of a modifying scene is normally recorded at the site of the foundation scene, preferably using certain artifacts of the foundation scene to place objects of the modifying scene for recording by the recording video camera 18. However, the modifying image 10 can be recorded by the video camera 18 at a location remote from the foundation scene provided that objects in the modifying scene are so placed that objects in the modifying image 10 and in the foundation image 6 will be properly located relative to each other when viewed as the combined image 12.

Associated with the video camera 18 is a camera vantage position monitoring function 24 for monitoring the instant value of certain operating parameters of the video camera 18, these being any or all of the video camera x,y,z position, viewing direction axis, tilt, and depth of focus. An output from the monitoring function 24 is digitized and added as metadata to the video stream data stored in memory 22 so that data for each stored video stream has associated with it synchronized camera vantage position metadata. For a modifying image 10 generated using the videographics software 20, corresponding videographics vantage position metadata is generated by a videographics vantage position function 25 and stored in the memory 22 with the digital videographics data, the vantage position metadata being generated directly from routines within the videographics software 20.

The viewing phase sub-system 16 includes the heads-up viewing device 8 of FIG. 1 which is operable to display a combination of elements from a modifying image 10 and elements from a foundation image 6 which are combined at an image combiner 26. The foundation image 6 is generated from a foundation scene 28 solely or predominantly during the viewing phase, either at a video camera 30, from which the foundation image is provided to and displayed at the heads-up viewing device 8 ("video foundation"), or as a real space image observed via the heads-up viewing device 8 ("optical foundation"). Use of a video foundation image, while more complex in operational terms, has some advantage over use of an optical foundation image in allowing a greater degree of image manipulation as will be described presently. In the viewing phase, one or more parameters of the viewer's vantage position are identified at a viewer vantage position monitor 32. On the basis of the vantage position parameter data, corresponding modifying image data is retrieved from memory 34 and is used to generate a modifying image at a modifying image generator 36. The modifying image 10 is combined with the foundation image 6 at the image combiner 26 and the combined image is viewed by the viewer at the heads-up viewing device 8.

Modifying image data stored in memory 22 and/or 34 may be video data, videographics data or a combination of video data and videographics data. The particular modifying image data retrieved from memory depends on the nature of viewer vantage position and other data associated with the viewer and the viewing activity, so that the modifying image 10 developed corresponds in time and apparent vantage position to the instant vantage position of the viewer. The modifying image 10 may be still, such as an image of buildings, or moving, such as an image of people working.

Figure 4:
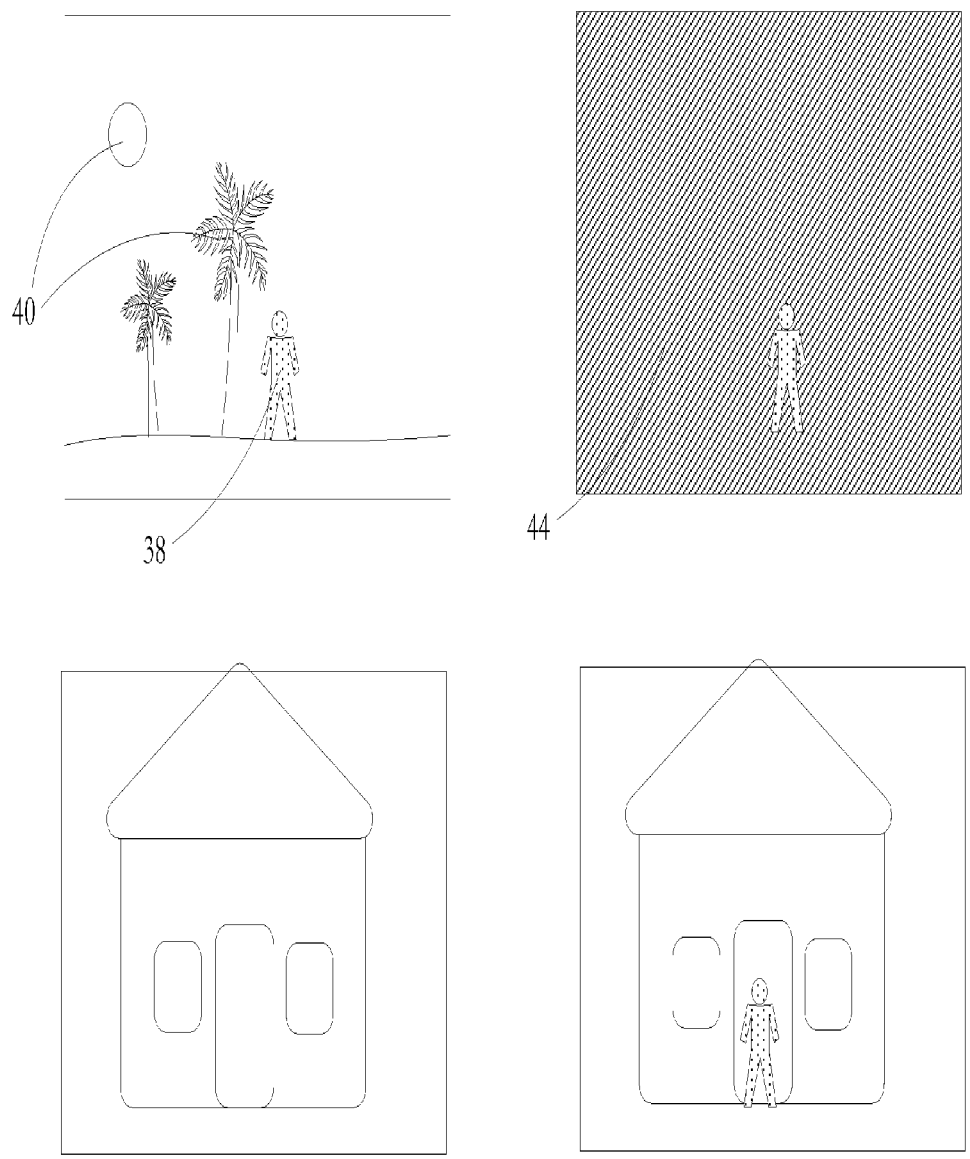
FIG. 4 shows stages in a background suppression routine forming part of a method according to one embodiment of the invention.

The modifying image 10 and the foundation image 6 can be considered as each comprising certain objects and background. Background to be viewed as part of the combined image 12 is normally delivered as part of the foundation image 6 while background present in the initially generated modifying image 10 is normally suppressed. As shown in the top left rectangle of FIG. 4, an initial modifying image 10 is assumed to have been generated by recording video camera 18, the initial modifying image containing a desired foreground object 38 in the form of a standing person and an undesired background 40 which is here shown as trees and sun. In preparation for suppressing the unwanted background from the modifying image 10, the object 38 intended to remain in the modifying image is marked for example with small areas of colour of a defined wavelength distributed over the entire object surface. An objects detection sensor function 42, shown in the FIG. 3 schematic diagram, and mounted with the video camera 18, receives a component of the modifying scene being recorded by the video camera and senses the existence and location of the marked areas signifying the desired foreground object 38. Under a control signal generated from the objects detection sensor function 42, the recording video camera 18 generates an image of the marked object 38. At other parts of the scene, where no marker output is sensed, a monochrome background development function 43 develops a monochromatic portion 44 as shown in the top right rectangle of FIG. 4. Subsequently, during the viewing phase, the monochromatic portion 44 within the modifying image data is detected and suppressed at a background suppression function 45 shown in FIG. 3 so that in the combined image displayed to the viewer (bottom right rectangle of FIG. 4), the viewer sees background content from the foundation image (bottom left rectangle). In the case of a modifying image developed using videographics software, an image is developed that consists solely of desired foreground objects and no suppression step is needed. All areas not occupied by foreground objects are shown as monochromatic areas to be replaced by foreground from the foundation image.

In one embodiment of the invention, all processing capability, memory and stored data for generating available modifying images are carried by or mounted on the viewer. In another embodiment of the invention, minimal processing capability and memory are present in equipment carried by the viewer and a transmission path exists between the viewer and a remote server location or locations, where a significant amount of the processing capability and memory for the viewing phase are situated. For example, each of the viewer and the server locations can include a wireless transceiver forming part of a wireless network between the viewer and the server location. The wireless network is used to relay digital video data and vantage position and command data between the viewer and the server. A number of alternatives are possible in allocating memory, processing capability and stored data as between equipment at the viewer, equipment at one or more locations at the site of the foundation image, and equipment at a remote site. In addition, networks for conveying video data and vantage position data can include wired and wireless networks. Video data may be transmitted from a server site in real time as and when needed by a viewer or may be downloaded and locally stored as the viewer enters the foundation site or a particular part of the foundation site.

Figure 5:
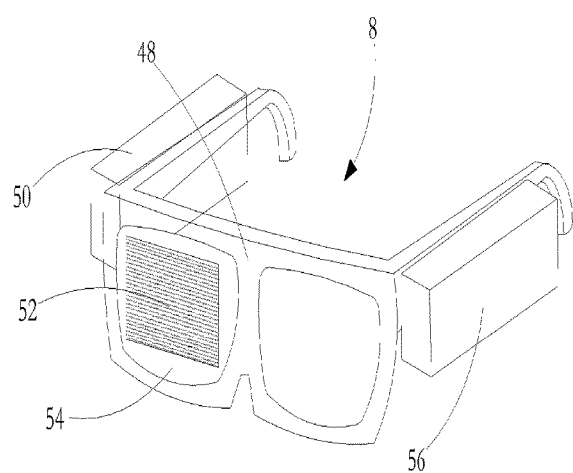
FIG. 5 shows one embodiment of a heads up viewing device embodying the invention.

Referring to FIG. 5, one form of a heads-up viewing device 8 for use in the viewing phase sub-system is shown. This has the form of modified eyeglasses and is functionally similar, in some respects, to the eyeglasses described by Buck in Patent Application Publication 2006/0271292, which is hereby incorporated by reference in its entirety. The modified eyeglasses have a frame 48 to which a heads-up imaging system 50 is mounted. One example of a heads-up imaging system is a 640×480 colour VGA capable heads-up display unit, the Second Sight M1100, from Interactive Imaging Systems, Inc. of Rochester, N.Y., this system including a display 52 which mounts to one of the lenses 54 of the modified eyeglasses. Another heads-up display is the iWear VR920 from Vuzix Corporation of Rochester, N.Y. While adaptations of such heads-up viewing devices may be suitable for certain embodiments of the invention, more complex heads-up viewing devices may be required for other of the embodiments described. Addressable display technology can be of any suitable technological type including LCDs, MEMs, etc. As an alternative to the eyeglasses form of heads-up display in which the modifying image is generated at an addressable display positioned at a conventional lens position of eyeglasses, the modifying image may be projected onto a partially reflecting screen to be viewed by the viewer, and the viewer looks through the screen to see the foundation scene. In yet another alternative, the addressable display technology can be implemented in a contact lens as described by Parviz et al., University of Washington, at the November, 2009 Biomedical Circuits and Systems conference in Beijing, China Also mounted to the eyeglasses frame 48 is a sensor system 56 forming part of the vantage position monitor 32 for monitoring a viewer's vantage position, meaning any one or more of position (x,y,z), viewing direction, head tilt, and depth of focus. To measure position, the sensor system has mounted within it a receiver which receives data from a high quality differential GPS (DGPS) or from local terrestrial triangulation beacons.

The sensor system 56 has an output to a central processing unit 58 for computing the position of the viewing device from the received GPS or triangulation data. To measure viewing direction, the sensor system 56 has mounted within it a compass which detects magnetic north and from this reference, azimuth or bearing angle is computed. A first level detector mounted in a plane transverse to the device viewing axis detects head tilt by sensing inclination from level of the viewing device. A second level detector mounted in a vertical plane containing the viewing axis senses elevation. Outputs corresponding to each of the measured parameters are developed from the respective sensors. The particular design and inter-relationship of sensors forming part of the sensor system is not critical and the sensor system 56 is shown in FIG. 5 as a composite block mounted to one leg of the eyeglasses frame 48.

Figure 6:
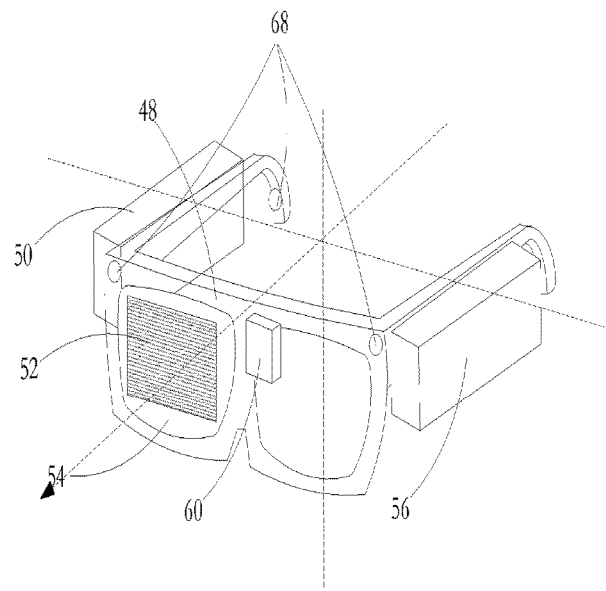
FIG. 6 shows another embodiment of a heads up viewing device embodying the invention.
Figure 7:
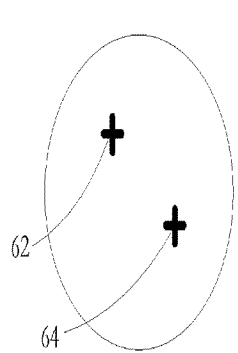
FIG. 7 shows a part of a field of view showing registration sight marks developed using a method according to one embodiment of the invention.
Figure 8:
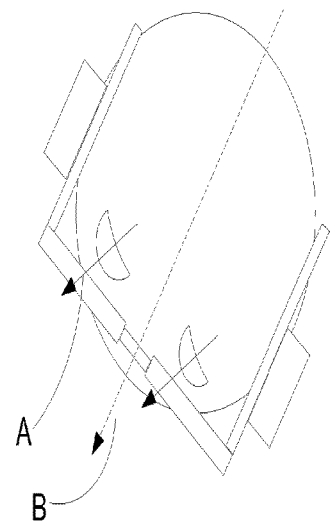
FIG. 8 is a top view of a person wearing a heads up viewing device according to an embodiment of the invention.
Figure 9:
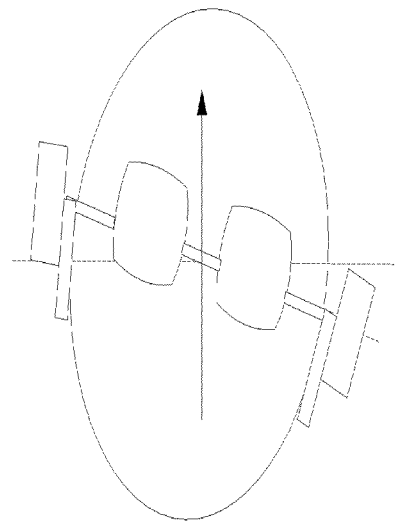
FIG. 9 shows a person wearing a heads up viewing device according to an embodiment of the invention and demonstrates one aspect of viewer vantage position.

As shown in an alternative embodiment illustrated in FIG. 6, the viewing device may also include an eyeball analyzer forming part of an eye gaze direction monitor 60. One form of eye gaze direction monitor is described in U.S. Pat. No. 4,595,990 (Garwin et al.) which refers to an earlier article by Merchant et al., "Remote Measurement of Eye Direction Allowing Subject Motion Over One Cubic Foot of Space", published in IEEE Transactions in Biomedical Engineering, BME 21, No. 4, July 1974, pp. 309-317, the patent and the article each being incorporated herein by reference in their entirety. An output from the eye gaze direction monitor 60 is used to generate a first sight point 62 in the viewer's field of view as represented in FIG. 7, this being indicative of the viewer's eyeball gaze direction as shown by arrow A in FIG. 8 showing a view from above of the viewer's head. An output from the vantage position monitor 56 is used to generate a second sight point 64 in the viewer's field of view, this being a point on the axis of the viewing device 8 and therefore indicative of the viewing direction as shown by the arrow B of FIG. 7. These two sight points are presented in the viewer's field of view and when lined up by the viewer adjusting his direction of gaze and/or the axis of the viewing device 8, signify that the viewer's eyeball gaze direction is aligned with the axis of the viewing device. During a viewing phase, the viewer seeks to keep the two sight points 62, 64 aligned to ensure that the modifying and foundation images will be properly matched in terms of respective vantage positions. The sight points are represented to the viewer not in such a way as to be unduly intrusive or to detract from the quality of the combined image when viewed.

The viewer vantage position monitor may include a depth-of-focus monitor including an eyeball analyzer which may be the same eyeball analyzer as is used for monitoring eyeball gaze direction and sharing certain sense circuit elements. In the depth-of-focus case, as known in the art, the eyeball analyzer has a sensor to detect changes in the spherical radius of the eyeball lens. An output from the depth-of-focus sensor forms a further component of the vantage position sensor system.

Other more or less sophisticated sensor systems for measuring viewing direction are possible and there is no intention to limit the application and construction of the invention to any particular sensor design. For example, in another form of sensor system, also illustrated as part of the alternative viewing device of FIG. 6, three or more spaced detectors 68 are positioned at spaced locations about the viewing device 8. The spaced detectors 68 each accurately monitor x,y,z positional data received from local terrestrial triangulation beacons. Viewing direction is then computed by appropriately comparing x,y,z values of the spaced detectors.

Figure 10:
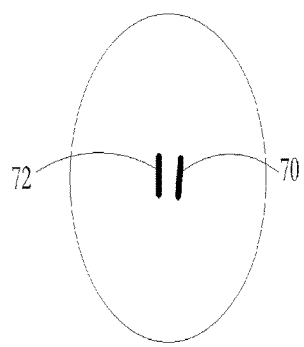
FIG. 10 shows a part of a field of view showing registration sight marks developed using a method according to one embodiment of the invention.

In certain embodiments of the invention, there may be circumstances where not all of the components of vantage position may need to be monitored: for example, the viewer is required always to maintain his two eyes level with each other (i.e. no head tilt); or alternatively, the system is to operate only in a single horizontal and/or vertical plane and therefore there is no requirement to measure the vantage position parameters corresponding to elevation and/or azimuth respectively. In such systems, certain components of the sensor system can be obviated or modified so as to operate solely to present sighting indicators in the viewer's field of view as illustrated in FIGS. 9-13. For example, and referring to FIGS. 9 and 10, if the viewer is constrained always to look at the foundation scene with head held vertically, there is no need for a head tilt parameter to be generated and used in generating the modifying image 10. In such an embodiment, the head tilt sensor output is used to generate and to present in the viewer's field of view a pair of sight lines, one line 70 aligned with the viewer's head tilt and the other line 72 aligned with a vertical plane containing the viewing device viewing axis as shown in circular frame of FIG. 10 representing the viewer's field of view. During the viewing phase, if the sight lines are misaligned as shown, this indicates that the viewer has her head on a tilt. In order to view the combined image 12 with the foundation image 6 and modifying image 10 in correct registration, the viewer adjusts her head tilt position until the two sight lines 70, 72 are aligned.

Figure 12:
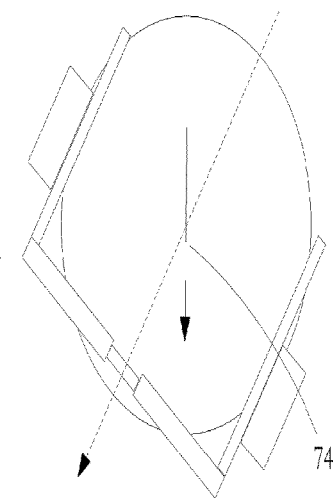
FIG. 12 shows a person wearing a heads up viewing device according to an embodiment of the invention, and demonstrates a further aspect of viewer vantage position.
Figure 13:
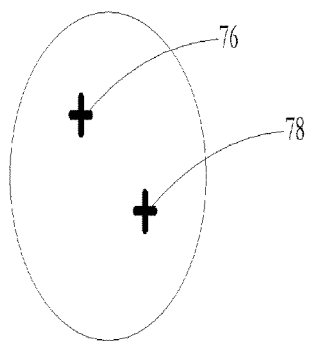
FIG. 13 shows a part of a field of view showing registration sight marks developed using a method according to one embodiment of the invention.

In another embodiment of the invention, the sensor system includes only positional (x,y,z) sensors. A modifying image 10 initially delivered to the viewer is selected on the presumption that the viewer's viewing direction is level (zero elevation) and has a desired bearing, X. As shown in the side view of FIG. 11, the viewer may initially be looking upwardly and, as shown in the top view of FIG. 12, may be looking at an angle to desired bearing 74. As represented in FIG. 13, "cross hairs" 76, 78 are generated using the vantage position sensor sub-system 56, one cross-hair 76 representing the position of zero elevation and the desired bearing and the other cross hair representing the actual elevation and angle away from the desired bearing of the viewer's current viewing direction. Any misregistration of the modifying image 10 with the foundation image 6 is then corrected by the viewer bringing the two "cross hairs" 76, 78 into registration. Clearly, the head tilt sight registration of FIGS. 9 and 10 can be combined with the sight registration scheme of FIGS. 11, 12 and 13. In a variation of this method, the sight lines and cross-hairs are not used. Instead, the viewer simply changes his head tilt and/or viewing direction until the viewed foundation image 6 appears to his perception to be in registration with objects in the modifying image 10.

As illustrated in the embodiments of FIGS. 5 and 6, the sensor system is mounted to the eyeglasses type viewing device 8 which is convenient because any sensed change in vantage position of the viewing device equates inevitably to a corresponding change in vantage position as sensed by the vantage position sensor system 56. However, the sensor system can be mounted at another part of the viewer's head provided that there is a substantially unchanging registration as between the viewer's head and the sensor system 56 and the viewer's head and the viewing device 8.

In use, a viewer dons the heads-up modified eyeglasses 8. An initialisation phase at power-up may include a calibration sequence in which certain properties or characteristics of the viewer and/or viewing environment are monitored or measured, as applicable. Such a calibration sequence may, for example, include performance of a test sequence to relate viewer eyeball lens spherical radius to selected depth of focus. The calibration sequence may also involve monitoring the height of the viewing device with the viewer standing on the ground. The calibration may also involve monitoring ambient and non-ambient light, etc. Such calibration may be used to determine certain video data streams that will not be needed during the viewing phase and may be used to determine certain video data streams that are highly likely to be needed during the viewing phase.

The wireless transceiver establishes communication with the wireless network and transmits the calibration data and initial vantage position data to a server location. On the basis of the received vantage position data, a digital video data controller retrieves corresponding digital video data from the memory at the server location and sends a video data stream to the viewer. The retrieved digital video data are data previously generated and recorded in the production phase, and may be video data, videographics data, or a combination of the two. The retrieved data is transmitted from the server location over the wireless network and is received by the viewer transceiver where it is used to generate the modifying image. The modifying image 10, elements of which are presented to the viewer, corresponds in vantage positional terms to the foundation image 6 being viewed by the viewer. Elements of the modifying image and the foundation image are combined at the heads-up viewing device 8.

In one embodiment of the invention, the viewer may have reviewed a menu of possible performance acts, respective acts having content considered by historians as being appropriate to particular eras. The viewer may make a selection from the menu which causes a command signal to be generated to call up a modifying image depicting the selected act. The selected act may be still: for example, it shows modifying image architectural features that may have existed in an earlier century combined with present architectural features derived from the foundation image. Or the selected act may be a moving image.

The command signal is transmitted to the video memory to initiate retrieval of a particular data stream for the selected act. The viewer typically elects to view the act from the beginning although, if the viewer has seen part of the act, then she may instruct video data streaming to start at some intermediate part of the act. As part of the initialization phase, the parameters of the present vantage position—some or all of x,y,z position, viewing direction, head tilt, and depth of focus of the viewing device—are monitored. Data corresponding to monitored parameters are then generated and transmitted to the memory controller. The memory controller determines what video data stream is developed so that the image viewed by the viewer is the appropriate image for the viewer's then-current vantage position.

The selected video data is the data corresponding to the present vantage position. No data associated with any other vantage position is accessed, except possibly as a result of running certain prediction, interpolation, etc., algorithms as will be described presently.

In one embodiment, the viewer is constrained to view a single combined video image corresponding to one vantage position (a single position, viewing direction, head tilt attitude and depth-of-focus) and adopts and maintains that particular vantage position during the course of the viewing phase. In another embodiment of the invention, a modifying image is presented for each of a series of vantage positions, the modifying image received at one vantage position differing from the modifying image received at a different vantage position. As the viewer moves, new viewer vantage position data is sent from the viewer to the server. At the server, the new vantage position data are analyzed. In response, a video stream corresponding to the new vantage position is retrieved and sent from the server over the wireless network to the viewer, where it is used to generate a different modifying image. Provided that changes to the modifying image are rapid and accurately accord with changes in the viewer's vantage position, this can give the viewer the impression that she is moving around or through the combined tableau.

Figure 14:
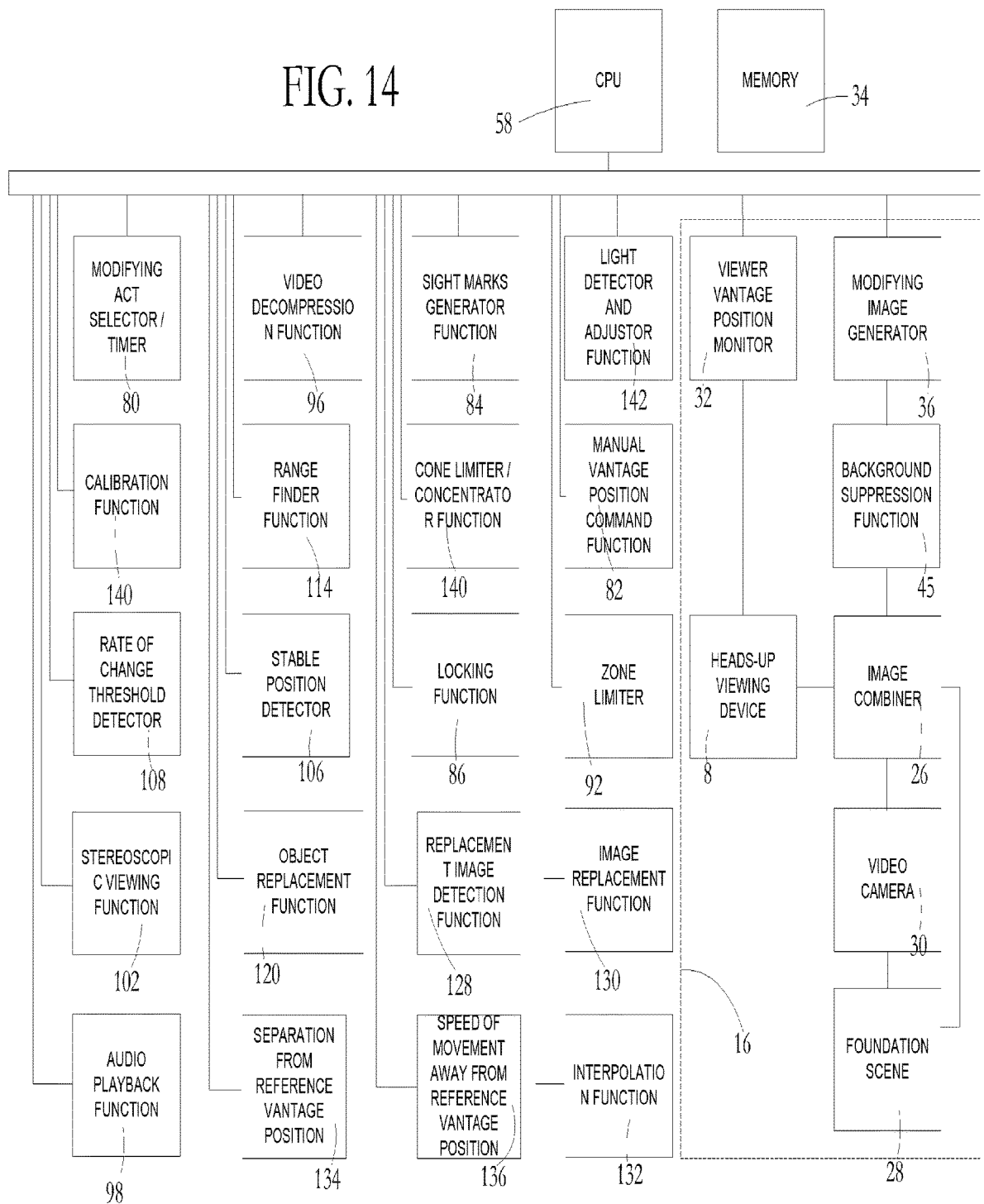
FIG. 14 shows a schematic diagram of a viewing subsystem according to one embodiment of the invention.
Figure 15:
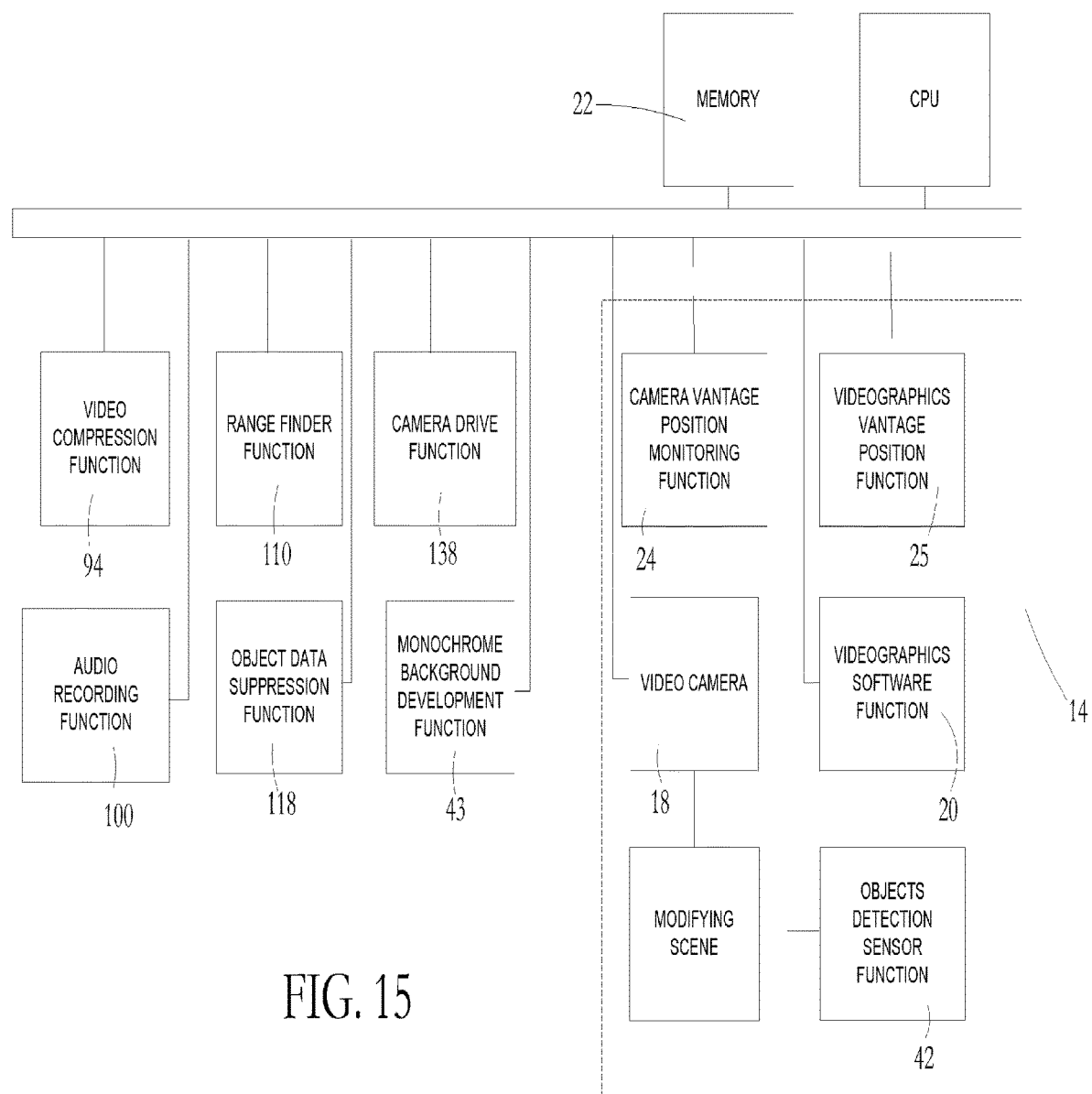
FIG. 15 shows a schematic diagram of a recording subsystem according to one embodiment of the invention.

In addition to basic system functions depicted in the schematic block diagram of FIG. 3, the system may have several optional functions depicted by further blocks shown in FIGS. 14 and 15, such optional functions being used to achieve more sophisticated performance and features at the cost normally of greater complexity of the production and viewing sub-systems, and more processing in the production and viewing phases. Some of the optional functions may be solely embodied in one or other of the production and viewing phase sub-systems, while others may have components within both sub-systems.

Referring to FIG. 14, the viewing phase sub-system includes a modifying act selector/timer 80. This function enables the tourist to choose a particular act to view as a modifying image. For example, at a historical site, the viewer may wish to view a video act typical of one earlier century and then view an act typical of a later century. Or the viewer may want to see an enactment of a particular event, such as a battle. The selector/timer 80 may include a control available to the viewer to start, stop, fast forward and reverse the performance of any such act.

The viewing phase sub-system optionally includes a manual vantage position command function 82. Such a function provides an alternative or additional method for generating vantage position control data in comparison with generating the vantage position control data using the sensor system 56 described with reference to FIGS. 5 and 6. By means of the manual vantage position command function, the viewer operates a manually operated controller to transmit any or all of shift up/down, shift left/right, rotate clockwise/anticlockwise, focus in/out command signals to a receiver where the received signal is processed and used to select the modifying image presented at the viewing device 8.

Figure 11:
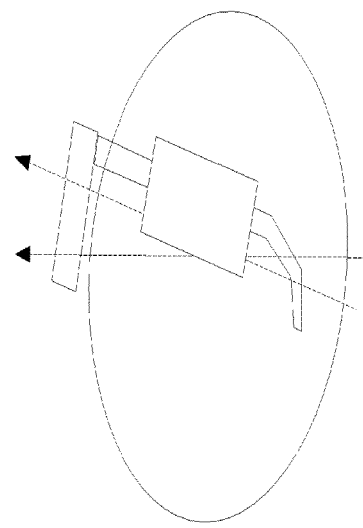
FIG. 11 shows a person wearing a heads up viewing device according to an embodiment of the invention, and demonstrates another aspect of viewer vantage position.

The viewing phase sub-system optionally includes a sight marks generator function 84. Such a function was described with reference to the embodiments of FIGS. 9-13 and is used to generate sight marks associated with the difference in eye gaze direction and viewing direction (FIGS. 9 and 10) and/or with pre-registration positions of the modifying image and the foundation image (FIGS. 11-13). By appropriate adjustment of vantage position, the viewer can bring particular pairs of viewed sight marks or lines into registration, at which point she knows that she has achieved registration between the modifying image and the foundation image.

Figure 16:
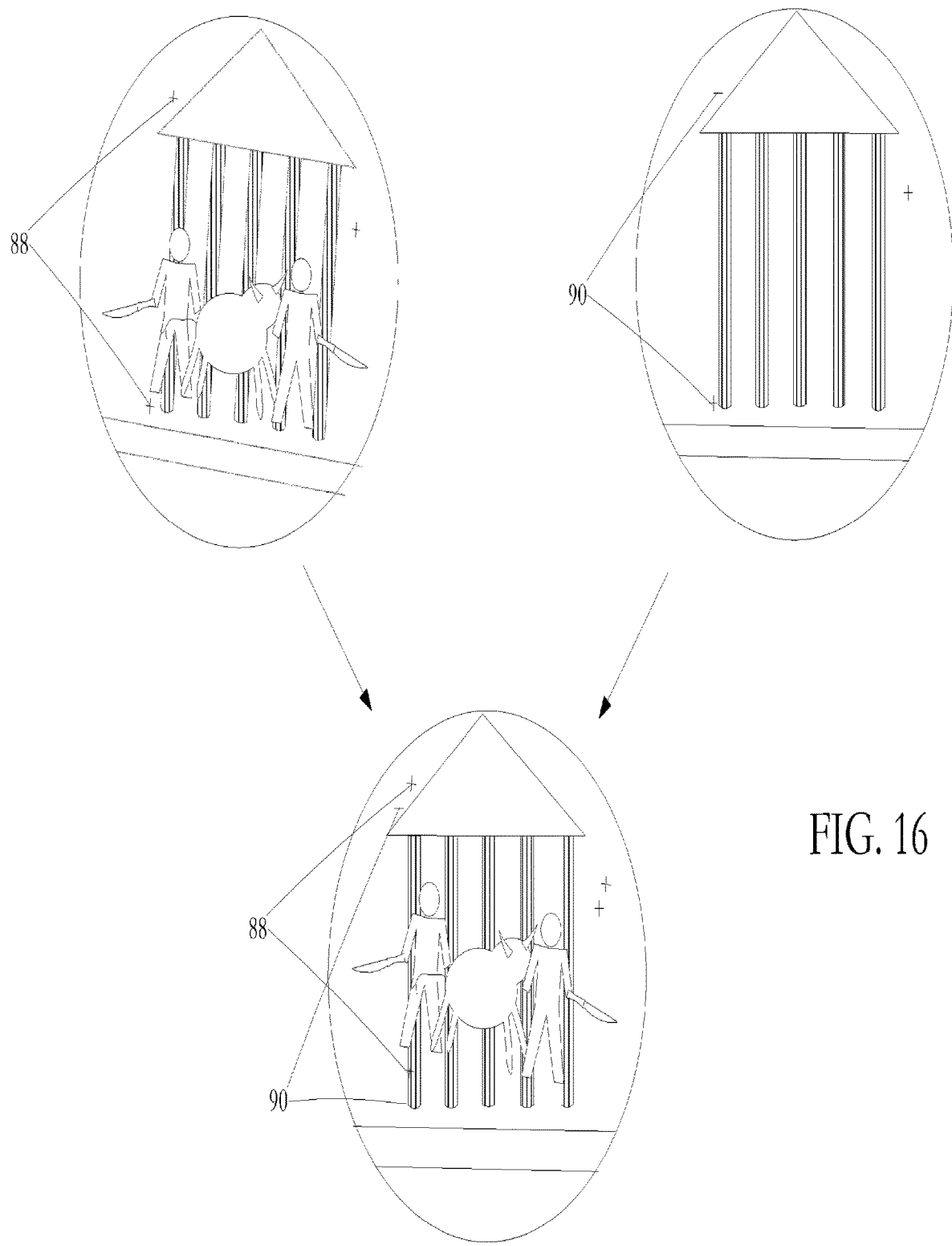
FIG. 16 shows a schematic view of a part of each of a foundation, modifying and combined image produced in the course of operating a system according to one aspect of the invention.

The use of vantage position data or manual control to position the modifying image in the viewer's field of view may result in some positional misregistration of the modifying image with the foundation image. For example, the modifying image may be translationally or angularly displaced relative to the foundation image. Or the modifying image may be distorted as by stretching or contracting in one of more directions relative to the foundation image. Such misregistration may occur as the registration process nears completion or after the primary registration process is completed. In both situations, such minor misregistration is corrected using an optional locking function 86 in the viewing phase sub-system. One example of such a locking function depends on having recorded a number of registration positions in the modifying image 10 during the production phase. For example, when the modifying image 10 is being recorded by the recording video camera at the site of the foundation scene, a receiver at the video camera receives radio locking data transmitted from a number of radio transmitter beacons spaced around the foundation scene as depicted by image positions 88 shown in the recorded image at the top left circular field of view frame illustrated in FIG. 16. The locking data is recorded as metadata associated with the corresponding modifying image data. The same radio beacons also transmit positional data during the subsequent viewing phase when the foundation image 6 is being viewed through the viewing camera, and are depicted as image positions 90 in the top right circular frame of FIG. 16. The beacon signals are received at the viewing phase camera and processed at a registration unit. If the positions of the respective beacons are mismatched as between their positions in the foundation image and their positions in the modifying image, such mismatch being depicted in the lower circular field of view frame of FIG. 16, a locking registration adjustment is applied to the modifying image. As indicated, this can change the position of the modifying image translationally, angularly, or in other ways, as necessary.

Ideally, for a viewing experience offering a high measure of verisimilitude or virtual reality, an available modifying image should be accessible for every vantage position that might be adopted by a viewer during a viewing phase within a viewing distance of the foundation scene. Clearly, such an image library for a particular location connotes an enormous level of available stored digital video data and associated processing both in terms of the viewing session and the production session. For a practical system, the stored data requirement is reduced by having a limited number of vantage positions for which corresponding modifying image data is stored.

At its simplest, the invention is implemented with a single vantage position with one viewing position, one viewing direction and one depth-of-focus. In contrast, the viewing phase sub-system of FIG. 14 includes an optional zone limiting function 92, the operation of which depends on any or all of the parameters monitored by the vantage position monitor: i.e. x,y,z position, viewing direction, depth-of-focus and head tilt. The zone limiting function 92 determines whether modifying image data exists for the particular monitored viewer vantage position. If it does not, an output from the zone limiting function prevents data selection from the modifying images data memory and the viewer receives a visual or audible notification that no modifying image can be received by the viewer. A number of vantage positions for which video data is stored and available can be clustered in zones at the foundation site so that combined images are available to the viewer inside, but not outside, a cluster zone. During a viewing phase, the viewer may move from a combined image display zone, through a no-display zone, to a further combined image display zone. Alternatively, for a cluster of closely adjacent active vantage positions, there can be a smooth transition as the viewer walks through the cluster zone, and a combined image associated with one vantage position transitions relatively seamlessly to a combined image for an adjacent vantage position. The vantage positions may also be clustered as viewing directions within a defined angular viewing cone.

As indicated previously, a large modifying image library requires large memory and significant processing capability. Particularly for a low or zero action modifying image, memory and processing requirements are reduced by having certain modifying images presented only as a series of still images with a period of time between presenting each still image. As shown in FIG. 15, memory requirements can be further reduced at the expense of additional processing by utilizing a video compression function 94 in the production phase and a corresponding video decompression function 96 in the viewing phase. Various compression techniques are known and used in video coding standards such as MPEG-2, AV-1, etc, and such techniques, or adaptations of them, can be utilized in storing digital video data for embodiments of the present invention. In most conventional video applications, video compression algorithms are designed to have greatest efficacy when compressing single stream video. Storage of video data for modifying images according to the present invention lends itself to additional compression modes, since redundancy exists as between images at different but closely adjacent positions, at different but closely adjacent viewing directions, at different but closely adjacent depths of focus, and at different but closely adjacent time intervals. Compression schemes tailored to theses parallel redundancies within neighbouring video streams are possible.

In another embodiment of the invention, an audio playback function 98 forms a part of the viewing phase sub-system as shown in FIG. 14 and an audio recording function 100 forms part of the production phase sub-system as shown in FIG. 15. In one embodiment of such audio recording and playback functions, digital audio data and sound track metadata are integrated with digital video data comprising the modifying image data streams and the audio playback function 98 includes corresponding digital audio data decoding and audio generation equipment. The audio playback function 98 can be adapted to receive and decode a sound track that is made vantage position dependent by generating, in the course of the production phase, several sound tracks for each performed act corresponding to the sounds that might be heard at spaced locations in the act being depicted in the modifying image. As the viewer moves between different positions or focuses on different tableaux in the foundation scene, one sound track may be displaced by another. In a variation, appropriate audio control data is included in the metadata so that during a viewing phase, parallel sound tracks are adjusted in relative volume to present the verisimilitude of a soundscape. As the viewer passes between different tableaux within the historical scene, the soundscape changes, with one or more sound tracks fading as other sound tracks are amplified. In certain embodiments of the invention, audio data is integrated with a digital video stream and, it will be understood that the term video stream, as used in this specification, encompasses a video data signal that has such an integral audio component. In other embodiments of the invention, some or all of the available audio streams may exist independently of the video stream and retrieval of audio data may be under a viewer control function that is separate from the viewer's control of video data retrieval. For example, such an audio control operates to retrieve and deliver to the viewer an audio stream that is a function of the viewer's viewing direction so that the audio received by the viewer does not depend on where he is positioned, but at what he is looking. Such an audio stream can also include a selectable commentary so that the viewer can choose whether, for example, to hear a commentary related to the combined image being viewed or a combination of such a commentary and a soundscape corresponding to the image. In yet another arrangement, as opposed to or in addition to audio delivered to the viewer, text description related to what is being viewed is delivered to the heads-up viewing device, either integrated with the digital video stream or as a parallel stream.

Figure 17:
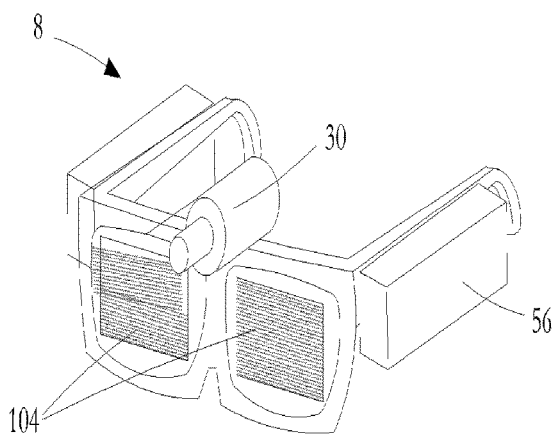
FIG. 17 shows a heads up viewing device according to an embodiment of the invention.
Figure 18:
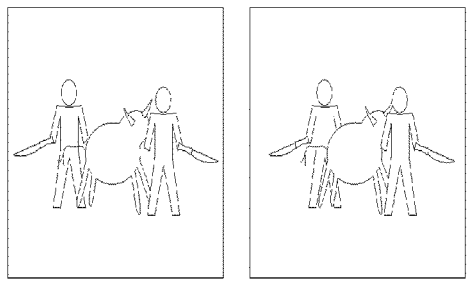
FIG. 18 shows a schematic view of parts of modifying images produced in the course of operating the system of FIG. 17.

In another embodiment of the invention, the viewing phase sub-system of FIG. 14 has an optional stereoscopic viewing function 102. As part of such a function, a modified eyeglasses heads-up viewing device 8 is formed with separately addressable displays 104 fabricated at each lens position as shown in FIG. 17. The stereoscopic function includes an addressing circuit operable to deliver modifying images individually to each of the viewer's eyes. As shown in FIG. 18, which depicts images being presented to the viewer's left and right eye displays, the modifying image delivered to the left eye display is marginally different from the modifying image delivered to the right eye display, the two video data streams corresponding to the vantage positions respectively of the viewer's left eye and right eye. By presentation of left and right modifying images, the viewer perceives a stereoscopic image giving the impression of depth. In this respect, attention is drawn to U.S. Pat. No. 4,984,179 ("the '179 patent") which is incorporated herein by reference in its entirety. Although primarily directed at a videographics technique, the '179 patent discloses a heads-up display which includes display units which present separate images to the respective eyes of a viewer so that a combined image is perceived stereoscopically. As described in the '179 patent, and applicable to the stereoscopic embodiment of this invention, operator eye movement is also monitored and used to modify images presented to the viewer to enhance the sense of realism. As shown in the FIG. 17 embodiment, a viewing video camera 30 is mounted to the eyeglasses and, as in previously described embodiments, the foundation image as recorded by the viewing video camera and is combined with the particular modifying image for presentation at the lens displays.

Figure 19:
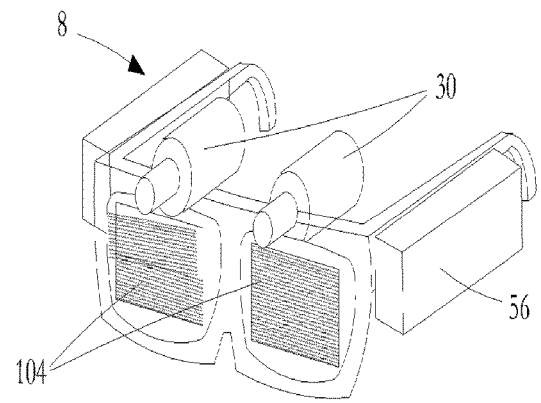
FIG. 19 shows a heads up viewing device according to another embodiment of the invention.
Figure 20:
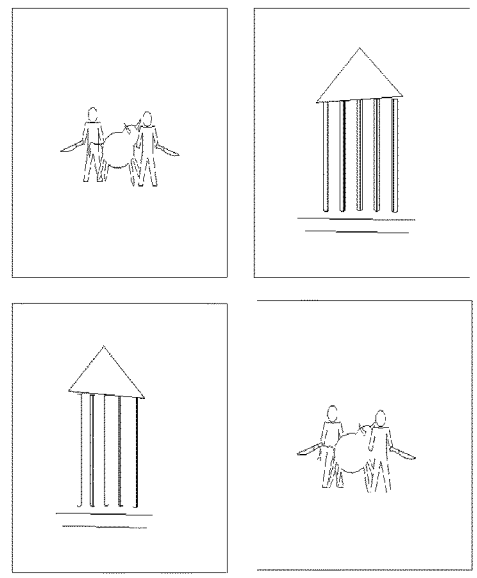
FIG. 20 shows a schematic view of parts of modifying images produced in the course of operating the system of FIG. 19.

In a variation shown in FIGS. 19 and 20, a modified eyeglasses heads-up viewing device 8 is used with a pair of viewing video cameras 30 mounted close to respective eyeglass lenses. The two viewing phase video cameras generate a left eye foundation image and a right eye foundation image, with parts of the two foundation images being delivered to respective viewing elements of the heads-up viewing device interlaced with parts of the modifying images delivered to the viewing elements. In this way, both the foundation image and the modifying image are viewed as stereoscopic versions to give an accentuated impression of depth.

In this particular example, the foundation images and the modifying images are delivered at separately addressable displays 104 occupying positions that would normally be occupied by a lens in a conventional pair of eyeglasses. It will be understood that it is not intended to be limited to such a viewing device. In another embodiment of the invention, the stereoscopic versions of the modifying image are projected onto a reflecting screen to be viewed by the viewer, the viewer looking through the screen to see the foundation scene.

As further shown in FIG. 14, the viewing phase sub-system optionally includes a stable position detector 106 which has an output used to cut off the display of a modifying image and to instead show a clear display when the viewer is moving in a translational sense, such a cut off being of value for navigating terrain, including the presence of other people, without collisions. The viewing phase sub-system also optionally includes a rate of change threshold detector 108. During the course of any vantage position change by the viewer, the viewer vantage position sensor system 56 and digital video retrieveal function are attempting to compute instant vantage position and to lock on to the video or videographics data feed for a corresponding modifying image 10. The modifying image delivered to the viewer is consequently changing rapidly. In view of delay in locking onto the right corresponding scene and the lack of settled data owing to the control system having to switch rapidly between memory locations corresponding to different video streams, the rate of change threshold detector has an output to suspend operation of the viewing sub-system during periods of relatively rapid change in viewer vantage position. The rate of change detector detects when there is, for any one or more governing vantage position parameters, a rate of change more than a preset threshold. When the rate of change threshold is triggered, the modifying image viewing sub-system shuts down for the period that the particular rate of change remains above the threshold. In these circumstances, the viewer is able to view only the foundation image through the viewing device. To inhibit operation of the rate of change threshold detector 108, the viewer may take care to alter her vantage position relatively slowly so that the modifying image remains visible throughout. Alternatively, the viewer may alter her vantage position relatively quickly, but then immediately fix her gaze at a desired target point in the foundation scene.

It will be understood that in aiming for historical verisimilitude when viewing a foundation scene, while some objects, moving or still, may be added to the foundation image by the modifying image, it may be desirable to suppress other elements, moving or still, from the foundation image.

In the embodiment illustrated in FIG. 2, the desired objects in the modifying image overlap and obscure all objects in the foundation image when the two images are combined. However, depending on vantage position, point of time during the performance of an act, etc., some objects to be represented in the modifying image would, in the combined tableaux, be expected to be in front of, and at least partly obscure, objects that are present in the foundation scene. Conversely, from different vantage positions, points of time, etc., some objects that are present in the foundation scene would, in the combined tableaux, be expected to be in front of objects depicted in the modifying image.

In a further embodiment of the invention, as shown in FIGS. 15 and 21, an optional range finder function 110 is used in association with the production phase video camera 18 to generate range metadata for objects that are to appear in the modifying image; i.e., a record is made of the distance from the camera of each of the objects which are desired to be depicted in the modifying image and is included as metadata in the stored modifying images video streams. To effect the range finder, as the modifying scene is scanned by the recording video camera 18, the field of view of the camera is monitored and a computation is effected to relate the instant scan position of the recording camera beam to an instant viewing direction: i.e. azimuth and elevation angle off the camera central viewing axis. Concurrently, GPS or local triangulation signals are received from spaced transmitters 111 on each object 113 which is to be viewed in the modifying image. The signal data associated with the objects are processed to assess each object's viewing direction from the camera 18. When there is a match between scan viewing direction and object beam direction, the position data of the object 113 is added as metadata to the digital video data stream.

As shown in FIGS. 14 and 22, a corresponding range finder function 114 is used in association with the video camera 18 recording the video foundation scene. As in the production phase, the instant scan position of the viewing video camera 18 is related to the off axis azimuth and elevation direction. Position data is received from transmitters 115 associated with objects 116 in the foundation scene and metadata is added to the video stream which shows the range of any object from the viewing camera 18 when a match occurs between camera scan viewing direction and the object beam direction.

As the combined image is developed, for each location in the scanned foundation scene, range data of any object in the foundation scene at that location is compared with any object range metadata in the modifying image data to ascertain which object is to be shown as closer to the viewer in the combined image. Then the one of the modifying and foundation images which has the relevant object fragment apparently closer to the viewer is selected as the superimposed image fragment as shown in FIG. 23.

The embodiment previously described relates to generating a modifying image by video recording during a production phase at the site where a combined image will later be viewed during a viewing phase. If, alternatively, the modifying image is generated by videographics software, then the range, i.e. distance from the viewer, of an object to be viewed in the modifying image, is preset by the developer. Metadata corresponding to these ranges is added to the video data during the production phase and is used in the viewing phase as described previously to properly arrange the objects of the modifying and foundation images so that image data representing objects that are to be perceived as closer to the viewer appear to overlap and obscure image data representing objects that are to be perceived as more distant from the viewer.

Another embodiment of the invention optionally includes an object suppression function 118 as shown in FIG. 15.

Figure 24:
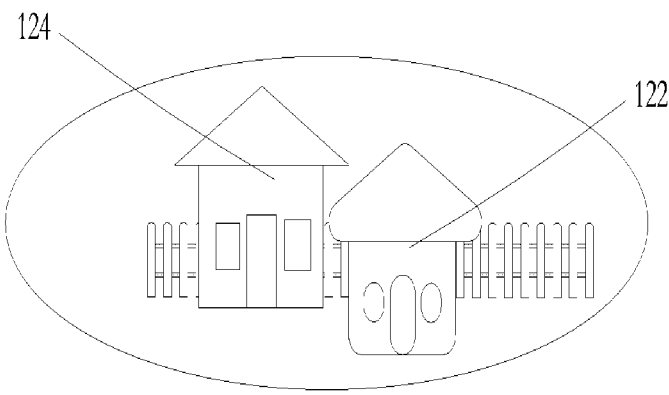
FIGS. 24 through 26 show image fragments developed during an unwanted object suppression routine forming a part of a method forming one embodiment of the invention.
Figure 25:
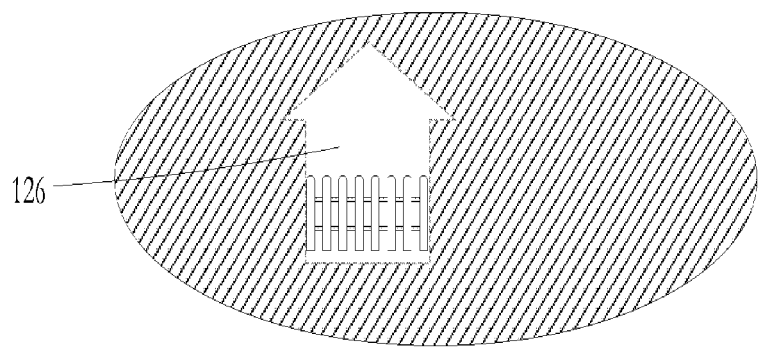
Figure 26:
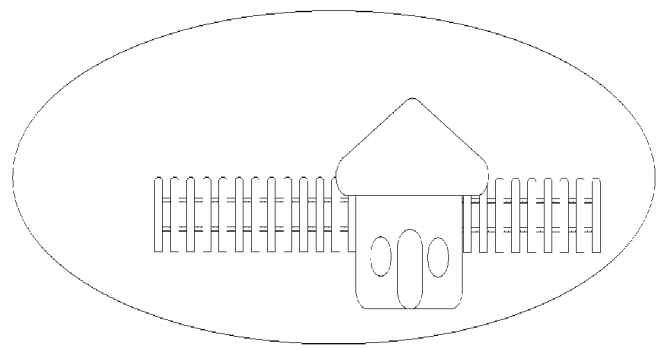

Following recording and storage of a preliminary modifying image, the image is post-processed at the object data suppression function 118 to identify an undesired object and to suppress data representing the undesired object and to replace it with data representing an extrapolation of a part of the preliminary modifying image immediately bounding the undesired object. Metadata showing the existence of the replacement data is recorded in the digital video data representing a final modifying image. As shown in FIG. 14, in the subsequent viewing phase, an object replacement function 120 operates to detect the suppression metadata in the modifying image data and, in response, to replace the undesired object in the foundation image by the replacement video data tagged by the metadata. The sequence is illustrated in FIGS. 24 to 26 in which a preliminary modifying image as shown at FIG. 24 includes both an old thatched cottage 122 and a modern outbuilding 124. The outbuilding detracts from the foundation scene's olden day historical verisimilitude. The modifying image data is post-processed so that as shown in FIG. 25, image data representing the outbuilding is replaced by replacement image data to represent an extrapolation 126 of that part of the image immediately bounding the outbuilding. The replacement image data are tagged so that in the viewing phase and as depicted in FIG. 14, the existence of replacement image data is detected by a replacement image detection function 128 and, under the control of an image replacement function 130, replace the outbuilding 124 recorded in the foundation image when the modifying and foundation images are combined as shown in FIG. 26. Consequently, upon viewing, the appearance of the outbuilding 124 is suppressed and in its place is an extrapolation of the foundation scene.

The previously described embodiments of the invention are characterized by reference positions, being vantage positions for which video stream data has been developed and stored for generating modifying images which are viewed as if from those vantage positions. During a viewing phase, viewing at certain unreferenced vantage positions for which no dedicated modifying image data has been stored may be acceptable provided distortion arising from misregistration of the modifying image and the foundation image is not too severe. After all, the combined image is to present an impression as opposed to fooling the viewer into believing that she is truly viewing a scene as it might have existed in the past. However, outside a confined zone of such unreferenced vantage positions, misregistration may be perceptually unacceptable.

In another embodiment of the invention, the viewing phase sub-system includes an interpolation function 132 as shown in FIG. 14. The interpolation function is used to generate digital video data for an unreferenced vantage position for which no specific digital video stream data is stored. To achieve this, the interpolation function processes stored video data corresponding to one or more reference vantage positions close to the unreferenced vantage position using a predetermined processing algorithm. In one variation, interpolation data is generated so as to approximate vantage position data for an unreferenced vantage position intermediate a plurality of reference vantage positions. Such interpolation can be based upon any or all of position, viewing direction, tilt and depth of focus. Such interpolation can be pixel based if the reference vantage positions are relatively close together. If the reference vantage positions are further apart, the interpolation can only practicably be based on those modifying images (or parts of modifying images) that are produced by videographics software, whether such software is used to develop a videographic modifying image or is used to post-process a video image to introduce videographics content and functionality into the video image.

In a variation of this embodiment, the modifying image data is generated by processing reference vantage position data to modify the retrieved modifying image data as a function of the viewer's detected motion away from or towards a reference vantage position. One example of such processing uses a distance from vantage position interpolator function 134 as shown in FIG. 14 and which monitors the viewer's distance from a reference vantage position (or away from a selected parameter value of the reference vantage position) and executes an appropriate processing algorithm as a function of that distance to approximate the modifying image that should exist at that distance from the reference vantage postion. Alternatively or in addition, as shown in FIG. 14, such processing includes a rate of change interpolator function 136 which monitors the rate of change of such movement and executes a different processing algorithm as a function of that rate of change to approximate the modifying image that should exist at an unreferenced vantage position on the basis of that monitored rate of change.

Referring to FIG. 15, a video data map for a series of contemporaneously available modifying images must be generated in the course of the production phase. In one method, modifying image data are recorded using a number of spaced production phase cameras. The cameras are, for example, fixed within an array to encompass a desired viewing zone. In one array, the cameras are distributed evenly over one form of a notional reference surface such as a cylindrical planar surface with cylinder axis vertically disposed and with the cylinder centred generally on the center of the scene. In another method, one or more production phase cameras are driven through a scanning sequence by a camera drive function 138. This function operates to drive each camera through a cycle that can involve translational and/or angular movement and/or depth of focus variation. Throughout the production phase, as previously described, data defining the instant recording position of each of the cameras is generated and is combined as metadata with the digital video data generated by the corresponding recording phase camera.

In the viewing phase, video stream data retrieved to generate a modifying image is limited to only that data required for the viewer's then-present field of view. The field of view is set partly by the viewer's depth of focus, which can be one of the monitored elements of the viewer's vantage position, and is otherwise defined by the viewer's natural viewing cone which may be of the order of 80 degrees subtended angle or less. Over 80 degrees, reduced perception of luminance, chromaticity and contrast mean that video stream data outside this viewing cone is essentially wasted. In a further embodiment of the invention, video data resolution is concentrated towards the centre of the viewing cone and reduces towards the margins of the viewing cone. In one embodiment, outside a preset viewing cone, no modifying image data is developed. As shown in FIG. 14, a cone limiter and concentrator function 140 operates to ensure that outside the preset viewing cone, the viewer perceives only the foundation image.

In a further embodiment of the invention, a light detector and adjustor function is used during a viewing phase. One or more light meters mounted adjacent the camera 30 co-located with the viewer are operated to monitor ambient and non-ambient luminance, chromaticity and possibly other light parameter levels. Control signals are generated on the basis of the monitored levels of luminance and chromaticity, etc. The control signals are used to generate a real-time modification of the image data used to generate the modifying image so that the modifying image and the foundation images do not have luminance, chromaticity or other light parameter levels which would cause a mismatch as between elements of the modifying image and elements of the foundation image when viewed as a combined image.

Video stream data transmitted to a viewer may be as a single dedicated channel which is demodulated and decoded by demodulation and decoding equipment forming part of the viewer's equipment. Alternatively, a set of video streams are selected from the totality of the available stored video streams based on select commands from, for example, a plurality of viewers. The video stream data for the selected video streams is mixed into a composite stream of video data which is transmitted via a communication path to the viewers. Each viewer has a viewer module operable to separate from the composite video data only the video data appropriate to that viewer's vantage position and to the particular video selection made by that viewer.

It will be seen that videographics processing may be implemented in the production phase, the viewing phase, or in both the production and viewing phases. Videographics preprocessing by the addition and/or the substitution of a videographics component to/for the video data is done (or is done mainly) in the production phase. Conventional animation software development tools may be used to identify object data and to link corresponding objects in successive frames.

In each of the previously described embodiments, elements of the foundation image and elements of the modifying image are described as being spatially combined at a display. Each of the embodiments can also be implemented with control circuitry which combines the foundation and modifying images temporally. For example, frames of modifying image are alternated with frames of foundation image at the heads-up display at a frame rate sufficiently high that the combined image is seen as a single video or videographics image of the modifying image elements superimposed on the foundation image elements.

What is claimed is:

1. A method, comprising:
retrieving, at a portable viewing device of a viewer, modifying image data depicting a scene as viewed from a plurality of reference vantage positions as recorded in the modifying image data;
determining a difference between a vantage position of the viewer and the plurality of reference vantage positions, wherein the vantage position of the viewer is unreferenced in the modifying image data, and wherein the vantage position of the viewer is different from the plurality of reference vantage positions;
identifying an adjacent reference vantage position that is adjacent to the vantage position of the viewer based on the difference between the vantage position of the viewer and the plurality of reference vantage positions;
generating a modifying image based on interpolating the modifying image data as viewed from the adjacent reference vantage position according to approximated vantage position data generated based on the difference between the vantage position of the viewer and the adjacent reference vantage position;
displaying, at the portable viewing device at a first viewing time, a first composite image comprising a foundation image and the modifying image;
tracking a change in the vantage position of the viewer; and
displaying, at the portable viewing device at a second viewing time, a second composite image comprising a second foundation image and a second modifying image corresponding to the change in the vantage position of the viewer and changed viewing time.

2. The method of claim 1, further comprising:
receiving, at the first viewing time, the foundation image from a camera device;
receiving, at the first viewing time, the modifying image data from a data store; and
generating the composite image based at least in part on combining the foundation image and the modifying image data.

3. The method of claim 1, wherein tracking the change in the vantage position of the viewer comprises:
monitoring to at least one of position, viewing direction, head tilt and depth of focus of the viewer; and
detecting one or more changes to the at least one of the position, the viewing direction, the head tilt and the depth of focus of the viewer.

4. The method of claim 1, further comprising:
receiving, at the second viewing time, the second foundation image from the camera device;
receiving, at the second viewing time, the second modifying image from the data store; and
generating the second composite image based at least in part on combining the second foundation image and the second modifying image.

5. The method of claim 1, further comprising:
receiving, at the first viewing time, a first audio recording corresponding to the vantage position of the viewer; and
playing, at the first viewing time, the first audio recording via an audio player of the viewing device.

6. The method of claim 5, further comprising:
receiving, at the second viewing time, a second audio recording corresponding to the changed vantage position of the viewer; and
playing, at the second viewing time, the second audio recording via the audio player.

7. The method of claim 6, further comprising:
generating the first audio recording from a plurality of sound tracks based at least in part on adjusting respective volumes of the sound tracks according to the vantage position; and
generating the second audio recording from the plurality of sound tracks based at least in part on adjusting the respective volumes of the sound tracks according to the changed vantage position.

8. A system, comprising:
one or more processors; and
a memory storing instructions that, when executed on or across the one or more processors, cause the one or more processors to:
retrieve modifying image data depicting a scene as viewed from a plurality of reference vantage positions as recorded in the modifying image data;
determine a difference between a vantage position of the viewer and the plurality of reference vantage positions, wherein the vantage position of the viewer is unreferenced in the modifying image data, and wherein the vantage position of the viewer is different from the plurality of reference vantage positions;
identify an adjacent reference vantage position that is adjacent to the vantage position of the viewer based on the difference between the vantage position of the viewer and the plurality of reference vantage positions;

generate a modifying image based on interpolation of the modifying image data as viewed from the adjacent reference vantage position according to approximated vantage position data generated based on the difference between the vantage position of the viewer and the adjacent reference vantage position;

display, at a display device at a first viewing time, a first composite image comprising a foundation image and the modifying image;

track a change in the vantage position of the viewer; and display, at a second viewing time, a second composite image comprising a second foundation image and a second modifying image corresponding to the change in the vantage position of the viewer and changed viewing time.

9. The system of claim 8, wherein the memory further comprises instructions that cause the one or more processors to:

receive, at the first viewing time, the foundation image from a camera device;

receive, at the first viewing time, the modifying image data from a data store; and generate the composite image based at least in part on combining the foundation image and the modifying image data.

10. The system of claim 8, further comprises a position monitor configured to:

monitor to at least one of position, viewing direction, head tilt and depth of focus of the viewer; and detect one or more changes to the at least one of the position, the viewing direction, the head tilt and the depth of focus of the viewer.

11. The system of claim 8, wherein the memory further comprises instructions that cause the one or more processors to:

receive, at the second viewing time, the second foundation image from the camera device;

receive, at the second viewing time, the second modifying image from the data store; and generate the second composite image based at least in part on combining the second foundation image and the second modifying image.

12. The system of claim 8, further comprising an audio player, wherein the memory further comprises instructions that cause the one or more processors to:

receive, at the first viewing time, a first audio recording corresponding to the vantage position of the viewer; and play, at the first viewing time, the first audio recording via the audio player.

13. The system of claim 12, wherein the memory further comprises instructions that cause the one or more processors to:

receive, at the second viewing time, a second audio recording corresponding to the changed vantage position of the viewer; and play, at the second viewing time, the second audio recording via the audio player.

14. The system of claim 13, wherein the audio player is configured to:

generate the first audio recording from a plurality of sound tracks based at least in part on adjusting respective volumes of the sound tracks according to the vantage position; and generate the second audio recording from the plurality of sound tracks based at least in part on adjusting the respective volumes of the sound tracks according to the changed vantage position.

15. One or more non-transitory computer-readable storage media storing instructions that, when executed on or across the one or more processors, cause the one or more processors to:

retrieve modifying image data depicting a scene as viewed from a plurality of reference vantage positions as recorded in the modifying image data;

determine a difference between a vantage position of a viewer and the plurality of reference vantage positions, wherein the vantage position of the viewer is unreferenced in the modifying image data, and wherein the vantage position of the viewer is different from the plurality of reference vantage positions;

identify an adjacent reference vantage position that is adjacent to the vantage position of the viewer based on the difference between the vantage position of the viewer and the plurality of reference vantage positions;

generating a modifying image based on interpolation of the modifying image data as viewed from the adjacent reference vantage position according to approximated vantage position data generated based on the difference between the vantage position of the viewer and the adjacent reference vantage position;

display, at a display device at a first viewing time, a first composite image comprising a foundation image and the modifying image;

track a change in the vantage position of the viewer; and displaying, at a second viewing time, a second composite image comprising a second foundation image and a second modifying image corresponding to the change in the vantage position of the viewer and changed viewing time.

16. The non-transitory one or more computer-readable storage media of claim 15, further comprising instructions that cause the one or more processors to:

receive, at the first viewing time, the foundation image from a camera device;

receive, at the first viewing time, the modifying image data from a data store; and generate the composite image based at least in part on combining the foundation image and the modifying image data.

17. The non-transitory one or more computer-readable storage media of claim 15, further comprising instructions that cause the one or more processors to:

monitor to at least one of position, viewing direction, head tilt and depth of focus of the viewer; and detect one or more changes to the at least one of the position, the viewing direction, the head tilt and the depth of focus of the viewer.

18. The non-transitory one or more computer-readable storage media of claim 15, further comprising instructions that cause the one or more processors to:

receive, at the second viewing time, the second foundation image from the camera device;

receive, at the second viewing time, the second modifying image from the data store; and generate the second composite image based at least in part on combining the second foundation image and the second modifying image.

19. The non-transitory one or more computer-readable storage media of claim 18, further comprising instructions that cause the one or more processors to:
receive, at the first viewing time, a first audio recording corresponding to the vantage position of the viewer;
play, at the first viewing time, the first audio recording an the audio player;
receive, at the second viewing time, a second audio recording corresponding to the changed vantage position of the viewer; and
play, at the second viewing time, the second audio recording via the audio player.

20. The non-transitory one or more computer-readable storage media of claim 15, wherein the adjacent reference vantage position is a closest reference vantage position of the reference vantage positions relative to a representation of the vantage position of the viewer in the modifying image data.

\* \* \* \* \*